(12) United States Patent
Gupta et al.

(10) Patent No.: US 11,755,489 B2
(45) Date of Patent: Sep. 12, 2023

(54) CONFIGURABLE INTERFACE CIRCUIT

(71) Applicant: Apple Inc., Cupertino, CA (US)

(72) Inventors: Rohit K. Gupta, Santa Clara, CA (US);
Rohit Natarajan, Sunnyvale, CA (US);
Jurgen M. Schulz, Pleasanton, CA
(US); Harshavardhan Kaushikkar,
Santa Clara, CA (US); **Connie W.
Cheung**, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/463,292

(22) Filed: Aug. 31, 2021

(65) Prior Publication Data

US 2023/0064369 A1    Mar. 2, 2023

(51) Int. Cl.
*G06F 12/0871* (2016.01)
*G06F 13/16* (2006.01)
*G06F 12/02* (2006.01)
*G06F 3/06* (2006.01)

(52) U.S. Cl.
CPC ........ *G06F 12/0871* (2013.01); *G06F 3/0607* (2013.01); *G06F 3/067* (2013.01); *G06F 3/0664* (2013.01); *G06F 12/0238* (2013.01); *G06F 13/1673* (2013.01)

(58) Field of Classification Search
None
See application file for complete search history.

(56) References Cited

U.S. PATENT DOCUMENTS

| | | | |
|---|---|---|---|
| 6,098,128 A * | 8/2000 | Velez-McCaskey | ........................ G06F 11/1076 711/E12.019 |
| 1,067,869 A1 | 6/2020 | Pugsley et al. | |
| 1,091,547 A1 | 2/2021 | ChoFleming et al. | |
| 2007/0121668 A1* | 5/2007 | Moretti | ................. G06F 13/385 370/465 |
| 2009/0164703 A1* | 6/2009 | Racino | ................ G06F 13/4239 711/E12.008 |
| 2014/0164673 A1* | 6/2014 | Woo | .................... G06F 13/1673 711/149 |
| 2018/0113826 A1* | 4/2018 | Li | ........................... G06F 13/24 |
| 2018/0150372 A1* | 5/2018 | Nachimuthu | ............. G06F 8/65 |
| 2020/0004683 A1* | 1/2020 | Kacevas | ............. G06F 12/0848 |
| 2021/0048991 A1 | 2/2021 | Tanner | |

* cited by examiner

*Primary Examiner* — Charles J Choi
(74) *Attorney, Agent, or Firm* — Kowert, Hood, Munyon, Rankin & Goetzel, P.C.; Erik A. Heter; Dean M. Munyon

(57) ABSTRACT

A configurable interface circuit is disclosed. An integrated circuit (IC) having a particular configuration. The IC includes a memory system and a communication fabric coupled to the memory system. The IC further includes a plurality of agent circuits configured to make requests to the memory system that are in a first format that is not specific to the particular configuration of the IC. A plurality of interface circuits is coupled between corresponding ones of the plurality of agent circuits and the communication fabric. A given one of the plurality of interface circuits is configured to receive a request to the memory system in the first format and output the request in a second format that is specific to the particular configuration of the IC.

20 Claims, 8 Drawing Sheets

CONFIGURABLE INTERFACE CIRCUIT

BACKGROUND

Technical Field

This disclosure is directed to computer systems, and more particularly, to interface circuits for coupling different functional circuits of a computer system to one another.

Description of the Related Art

A single computer architecture may have a number of different implementations. The various implementations may include common circuits, such as memory controllers, cache memories and corresponding controllers, processor cores, and so on. The number of these different circuits may vary from one implementation of an architecture to another. To facilitate communications among the various functional circuits in different implementations thereof, custom interface circuitry may be provided for the different implementations of the computer architecture.

SUMMARY

A configurable interface circuit is disclosed. In one embodiment, an integrated circuit (IC) having a particular configuration. The IC includes a memory system and a communication fabric coupled to the memory system. The IC further includes a plurality of agent circuits configured to make requests to the memory system that are in a first format that is not specific to the particular configuration of the IC. A plurality of interface circuits is coupled between corresponding ones of the plurality of agent circuits and the communication fabric. A given one of the plurality of interface circuits is configured to receive a request to the memory system in the first format and output the request in a second format that is specific to the particular configuration of the IC.

In various embodiments, the plurality of interface circuits is coupled between corresponding ones of the plurality of agent circuits and one or more components (e.g., such as a communication fabric or other type of communication network). For a given agent circuit, a corresponding given interface circuit is configured to present an interface to the memory system via the one or more components that is transparent with respect to the interface requirements of the one or more components.

BRIEF DESCRIPTION OF THE DRAWINGS

The following detailed description makes reference to the accompanying drawings, which are now briefly described.

DETAILED DESCRIPTION OF EMBODIMENTS

Figure 1:
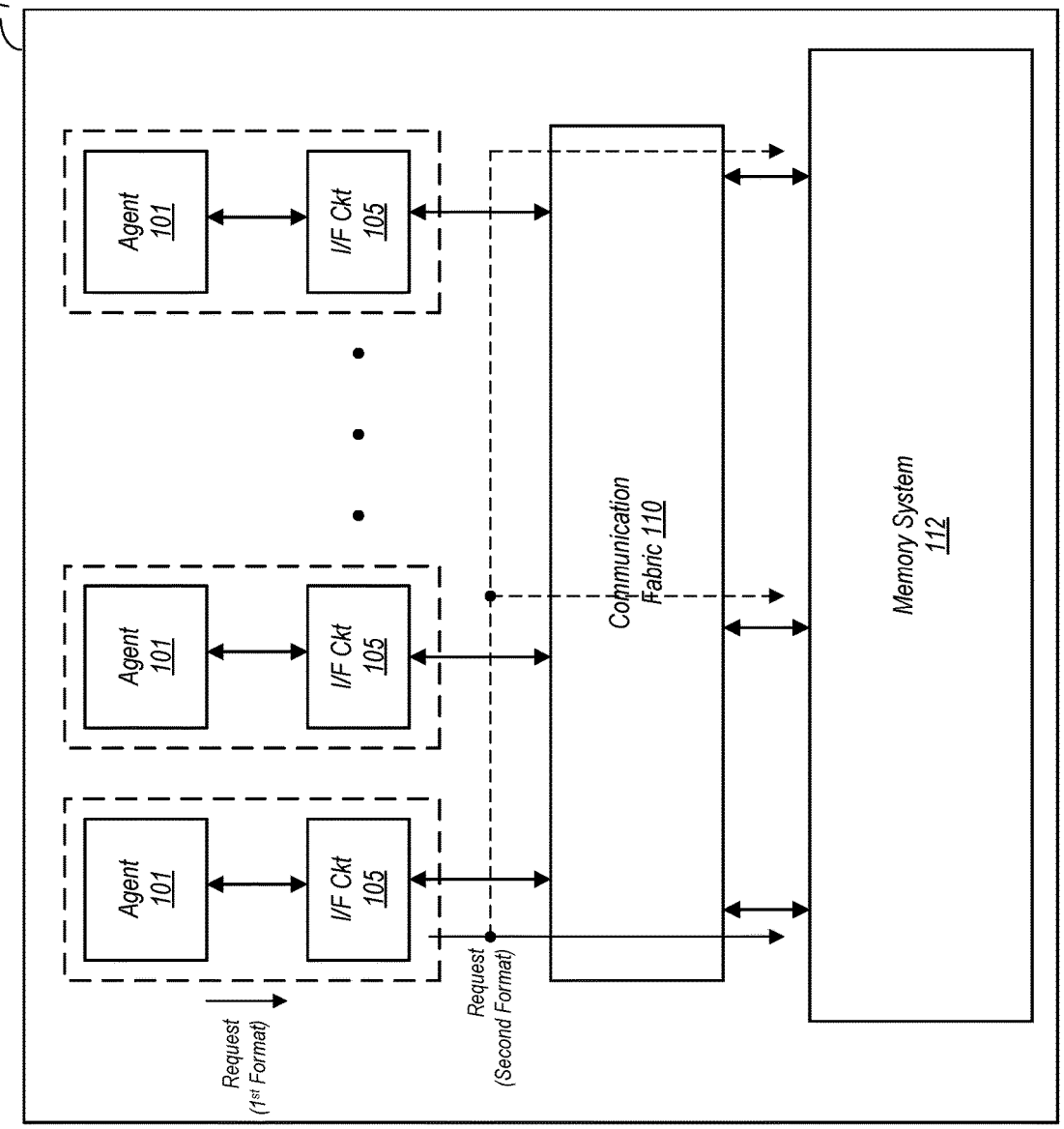
FIG. 1 is a block diagram of one embodiment of an integrated circuit (IC).

The present disclosure is directed to various embodiments of an IC that utilizes interface circuits between various agent circuits and other components thereon. Many IC families, such as a family of systems-on-a-chip (SoCs) have a number of possible configurations that may implement/enable different numbers of components thereon. For example, a family of SoCs may include a number of different configurations that includes, with respect to one another, different numbers of memory controllers, different numbers of cache controllers and corresponding cache memories, and so on. These configurations may also include a number of different agent circuits, such as processor cores, peripheral devices, and so on. Communication between the agent circuits and the memory controller, cache controllers, and so on, may be conducted through various components of, e.g., a communication fabric. Due to the fact that there are different configurations of the SoC, the topology of the fabric (and the IC overall) is different from one implementation to the next.

Communication between the various agent circuits and, e.g., the memory controllers via the communication fabric requires facilitation by interface circuitry. This interface circuitry is typically associated with the agent circuits. However, custom designing interface circuitry for each different configuration of an IC is a burdensome task, particularly if the designs of the agent circuits are to be used from one embodiment to the next.

Using the recognition of this problem as an insight, the present disclosure contemplates a configurable interface circuit. Instances of the configurable interface circuit may be coupled between various instances of the agent circuits. A given one of the configurable interface circuits may thus facilitate communications between the agent circuits and other components of the IC/SoC, e.g., between and agent circuit and a memory controller via a communication fabric. The configurable interface circuit may have a common design that is re-used for the various different implementations of the IC/SoC. For example, the same design of a configurable interface circuit may be instantiated on a first SoC having two memory controllers and on a second SoC having four memory controllers. The configurable interface circuit may, during a system startup, receive/determine details of the chip topology for the particular configuration of the IC. Using this information, the configurable interface circuit may be configure itself in such a manner to operate in the corresponding chip configuration. Communications between a particular agent circuit and other components of the IC/SoC may be conducted via a correspondingly coupled configurable interface circuit.

Using the configurable interface circuit may obviate the need to design custom interface logic to enable various agent circuits to be used in different topologies/configurations of an IC/SoC. Instead, both a common design of a particular agent circuit, along with a common design of the configurable interface circuit, may be used in different variations of an IC/SoC, irrespective of the different topologies. This may result in a significant simplification in designing different implementations of the IC/SoC. As an added benefit, the configurable interface circuit may be used to increase security by controlling an amount of access/bandwidth to other components of the IC/SoC that may be obtained by a particular agent circuit. Similarly, the configurable interface circuit may also control access to its respective agent circuit, and may thus provide increased security in this manner as well.

The present disclosure begins with a discussion of a block diagram to provide a basic description of a configurable interface. Additional block diagrams are then provided to enable description of features and operation of different embodiments of a configurable interface. Methods for operating an IC/SoC having at least one instance of a configurable interface implemented thereon are then discussed in conjunction with corresponding flow diagrams. The specification then concludes with a description of an example system in which a configurable interface may be implemented.

Integrated Circuit with Configurable Interface:

FIG. 1 is a block diagram of an IC having instances of a configurable interface circuit coupled between corresponding ones of the plurality of agent circuits and other components of the IC. In the embodiment shown, IC 100 is arranged in a particular configuration, and includes a memory system 112 and a communication fabric 110 coupled to memory system 112. IC 100 also includes a plurality of agent circuits 101, ones of which are configured to make requests to memory system 112 that are in a first format that is not specific to the particular configuration of IC 100. A plurality of interface circuits 105 are coupled between corresponding ones of the plurality of agent circuits 101 and communication fabric 110. A given one of the plurality of interface circuits 105 is configured to receive a request, from its respective agent circuit 101, to the memory system 112 in the first format and output the request in a second format that is specific to the particular configuration of the IC 100.

Generally speaking, each of the interface circuits 105 is configured to facilitate communications between correspondingly coupled ones of the agent circuits 101 initiated in formats, protocols, etc., that are not specific to the configuration of IC 100. The interface circuits 105 may translate and convey commands/requests to other components on IC 100 according to formats, protocols, etc., that are configuration specific. In doing so, the configurable interface circuits 105 present, for the correspondingly coupled agent circuits 101, an interface to the remainder of IC 100 that is transparent with respect to the interface requirements of, e.g., communication fabric 110 and other components on IC 100. This arrangement allows a particular design of an agent circuit 101 to be used in a number of different configurations of an IC. For example, use of the interface circuits 105 may allow a common design of a particular agent circuit to be instantiated in different versions of a scalable computer architecture or on variations of a particular SoC. The different versions of a particular IC/SoC upon which the agent circuits 101 may be instantiated may include different numbers of particular components (e.g., memory controllers, cache controllers, peripheral interfaces, etc.) with which an agent circuit 101 may conduct communications. However, due to the presence of the interface circuits 105, the need to provide a custom logic design in an agent circuit 101 to enable communications with these different numbers of components may be obviated.

The configurable interface circuits 105 may, in one embodiment, be configured during a system startup. Various mechanisms may be used in configuring these circuits. For example, in one embodiment, configurable interface circuits 105 may transmit one or more queries into communication fabric 110 and receive responses from other components coupled thereto (including other configurable interface circuits 105), storing the responses as configuration information in, e.g., registers. In another embodiment, a system BIOS (Basic Input Output System) may broadcast configuration information to the various components of IC 100, including the configurable interface circuits 105. Generally speaking, any suitable mechanism which provides IC-specific information to the configurable interface circuits 105 may be used in configuring them during the startup of the system that includes IC 100.

The various agent circuits 101 may be any of a number of different types of functional circuit units. For example, an agent circuit 101 may be a processor core or one of a number of processor cores on a multi-core processor/SoC (with the cores being heterogenous or homogenous), co-processor units, graphics processing units (GPUs) or individual cores thereof, and so on. The communication fabric 110 may include various types of components and links for facilitating on-chip communications. For example, embodiments of communication fabric 110 may include a number of point-to-point communication links, buses, crossbar switches, and/or other on-chip networking circuitry.

It is noted that many of the communications disclosed herein are discussed in terms of requests. However, the communications that are conveyed via ones of the configurable interface circuits 105 may be considered as one of a number of different types, including commands, queries, and so on. Furthermore, the terms "command" and "request" may be interchangeable in some instances. For example, the term "write command" could be used interchangeably with the term "write request," as both of these types of communications indicate that information is to be written to some location.

Figure 2:
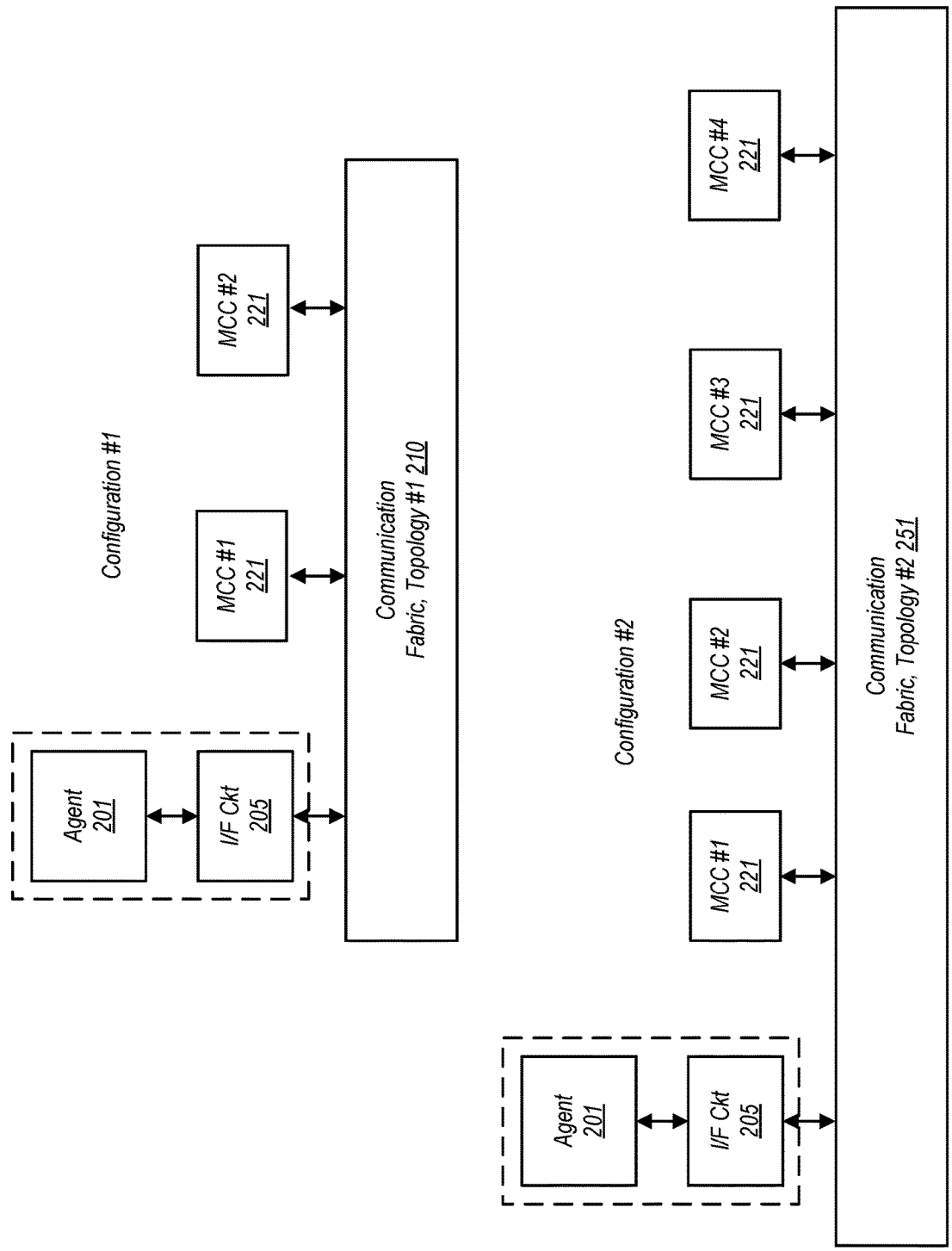
FIG. 2 is a block diagram illustrating two different configurations/embodiments of an of an IC utilizing interface circuits coupled between various agent circuits and a communication fabric.

Various IC Configurations with Configurable Interface Circuits:

FIG. 2 is a block diagram illustrating the used of one embodiment of a configurable interface circuit in different configurations of an IC. It is noted that these figures are provided for illustrative purposes, but are not intended to be limiting. Accordingly, the number of interface circuits, agent circuits, and other components included on the illustrated may be different than those shown here.

In Configuration #1, an example of an agent circuit 201 and a corresponding configurable interface circuit 205 are shown as being coupled to the communication fabric 210. The communication fabric 210 in this embodiment may have a first topology, Topology #1. The topology of communication fabric 210 may include, for example, a particular number of point-to-point links, switches, and/or other components used to implement an on-chip network.

The example of Configuration #1 also includes two memory cache controllers 221. Accordingly, interface circuit 205 is configured to facilitate communications between agent circuit 201 and the two instances of memory cache controller 221 in Configuration #1. The number of memory cache controllers 221, as well as the details of Topology #1 of Communication fabric 210 may be received by interface circuit 205 during a system startup, via one of the mechanisms discussed above. Other components that are not explicitly shown in FIG. 2 may also be implemented in Configuration #1. Similarly, the number of agent circuits 201 and correspondingly coupled interface circuits 205 may also be present despite not being explicitly shown here.

The example of Configuration #2 as illustrated in FIG. 2 includes an instance of an agent circuit 201 and corresponding interface circuit 205. Four instances of a memory cache controller 221 are also present. The communication fabric 251 in this embodiment is arranged in Topology #2, which is different from Topology #1. Accordingly, the number of components used to implement these respective topologies may be different from one another. It is also possible that one topology may include some components not included in the other. Similarly, the number of memory cache controllers 221 in the two illustrated configurations are different from one another, as may be true for other components that are not shown.

Despite the differences between Configurations #1 and #2, agent circuit 201 and interface circuit 205 may be the same design in both. Thus, while interface circuit 205 may be self-configuring using configuration/topology information received during a system startup, the design may be the same in both Configuration #1 and Configuration #2. Accordingly, a common design of configurable interface circuit 205 may be adapted to a number of different configurations. This in turn may allow a single, non-configuration specific design of agent circuit 201 to be used in different versions of an IC (with different topologies) without the need for custom-designed interface logic. Similarly, the same design of the configurable interface circuits 205 may be used in ICs with different topologies, with the various instances thereof being adapted to the particular IC configuration during a system startup routine using any suitable mechanism, including ones of the various mechanisms discussed herein.

Figure 3:
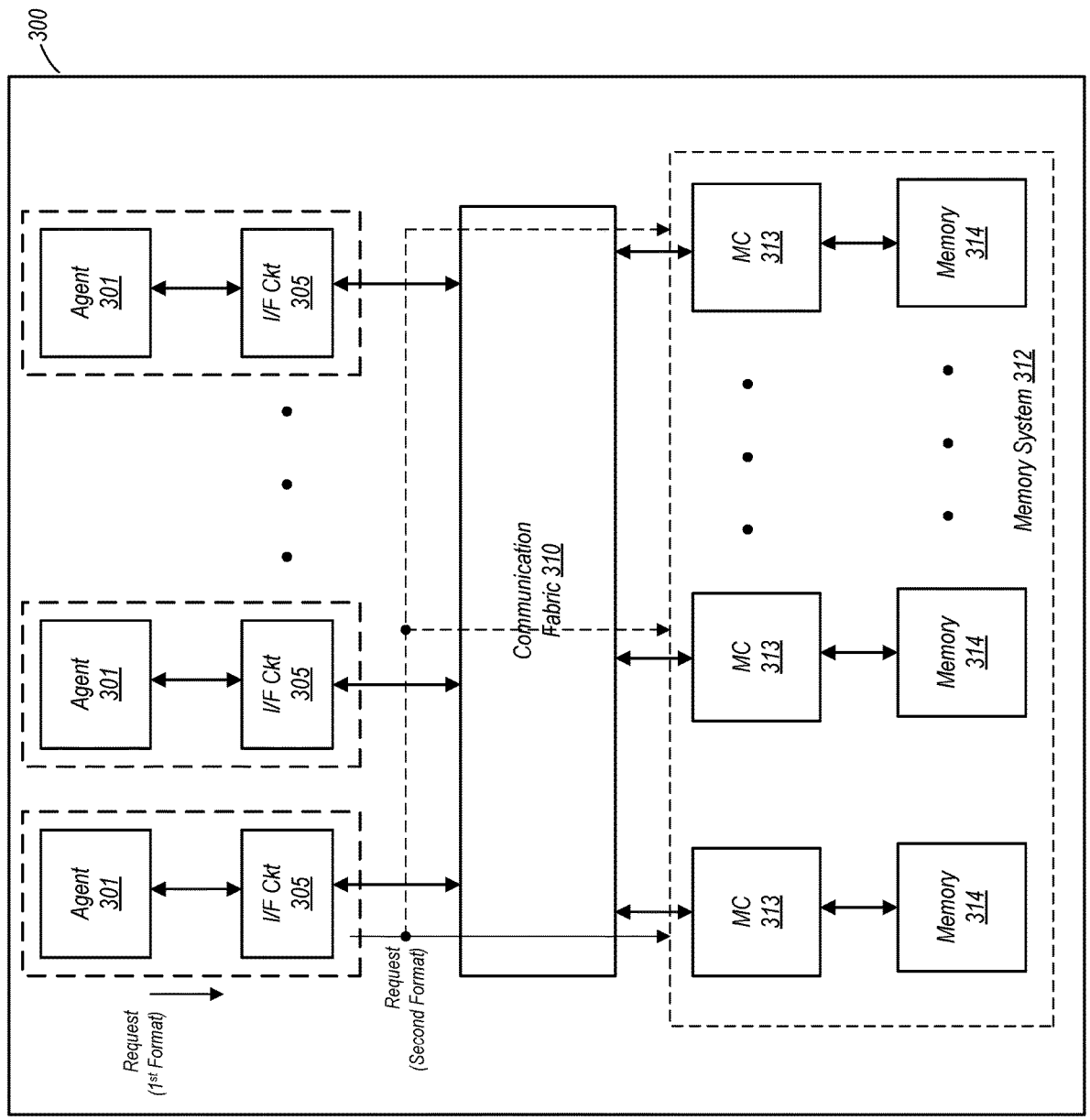
FIG. 3 is a block diagram of another embodiment of an IC.

FIG. 3 is a block diagram of another embodiment of an IC having a number of agent circuits and corresponding configurable interface circuits. In the embodiment shown, IC 300 is an SoC that includes a number of agent circuits 301, which may be ones of a number of different types of agent circuits, such as processor cores. It is noted that individual instances of the agent circuits 301 may be different from one another and may thus provide different types of functionality. However, the various instances/types of the agent circuits may have a common design that can be re-used over a number of different IC configurations/topologies when implemented in conjunction with a corresponding instance of a configurable interface 305.

The configurable interface circuits 305 in the illustrated embodiment are interposed between a corresponding agent circuit 301 and communication fabric 310. The communication fabric 310, in turn, is interposed between the interface circuits 305 and memory system 312. As with the other embodiments disclosed herein, communication fabric 310 may include various components suitable for realizing an on-chip network, and may be used to carry out communications between on-chip components using suitable protocols.

Memory system 312 in the embodiment shown includes a number of memory controllers 313 and corresponding memories 314. In some embodiments, the memories 314 may be part of a larger, contiguous memory having a corresponding contiguous range of physical addresses. Other embodiments are possible and contemplated in which the memories 314 are separate entities each having their own respective range of physical addresses.

The number of memory controllers 313 and arrangement of memory system 312 overall in the embodiment shown is not specifically visible to the various ones of agent circuits 301 due to their non-configuration specific design. Accordingly, when submitting a read or write request to a memory 314 in memory system 312, agent circuit 301 provides the request in a first, non-configuration specific format (with respect to the configuration of IC 300) to its correspondingly coupled configurable interface circuit 305. Upon receiving the request as initially submitted by its respective agent 301, interface circuit 305 transmits the request to memory system 312 in a second format that is specific to the configuration of IC 300.

In a similar manner, a configurable interface circuit 305 may facilitate communications with other ones of the components of IC 300. For example, a given agent circuit 301 may at times exchange information with other ones of the agent circuits 301 (which, as noted above, can be different types of functional circuits). These communications may be initiated by a particular one of agent circuits 301 in a first format not specific to the configuration of IC 300. The communications may be conveyed into the communication fabric 310, in a second, configuration-specific format by a corresponding configurable interface circuit 305. Ones of the other configurable interface circuits 305 may receive the communications in the second format, and convey it back to their respective agent circuits 301 in the first format.

As an illustrative example, consider an embodiment of IC 300 in which a particular agent 301 is a processor core having a local data cache. In order to maintain coherency of the data across multiple processor cores and within the memory system, the agent 301 may initiate a snoop to determine if a particular cache line is stored in other caches or has been written back to memory recently. However, due its non-configuration-specific design, the agent circuit 301 initiating the snoop does not have any specific visibility to the other agent circuits 301 and to, e.g., the various memory controllers 313 of memory system 312. Accordingly, the initiating agent circuit 301 may submit the snoop request to its respective configurable interface circuit 305 in a first format not specific to the configuration of IC 300. Since the respective configurable interface circuit 305 does have visibility to the other components implemented on IC 300, it may submit the snoop request in a second, configuration-specific format. Submitting the snoop request in the configuration-specific format may include providing information as to which ones of the other agents (e.g., other processor cores with local caches) are to receive the snoop request, as well as any cache controllers (not shown in this figure) and memory controllers that should also receive the request. In response to the snoop request, the various receiving components of IC 300 may respond, in the second format, to the interface circuit 305 from which it was received. Thereafter, the given interface circuit 305 may provide results of the snoop request to its respective agent circuit 301 in the first format.

It is noted that, since the second format is configuration-specific and since the configurable interface circuits 305 have visibility to the other components of the system, communications such as the snoop request may be tailored to be received only by pertinent system components. Thus, while another processor core and/or a cache request may receive communications such as a snoop request, other components of IC 300 to which a snoop request is not pertinent (e.g., a peripheral interface) may not be a recipient. This may help optimize the use of available on-chip communication bandwidth in IC 300. More generally, a given instance of a configurable interface circuit per the present disclosure may control an amount of bandwidth consumed by its corresponding agent circuit, e.g., by controlling the amount of access it has to a memory system, and so on.

Figure 4:
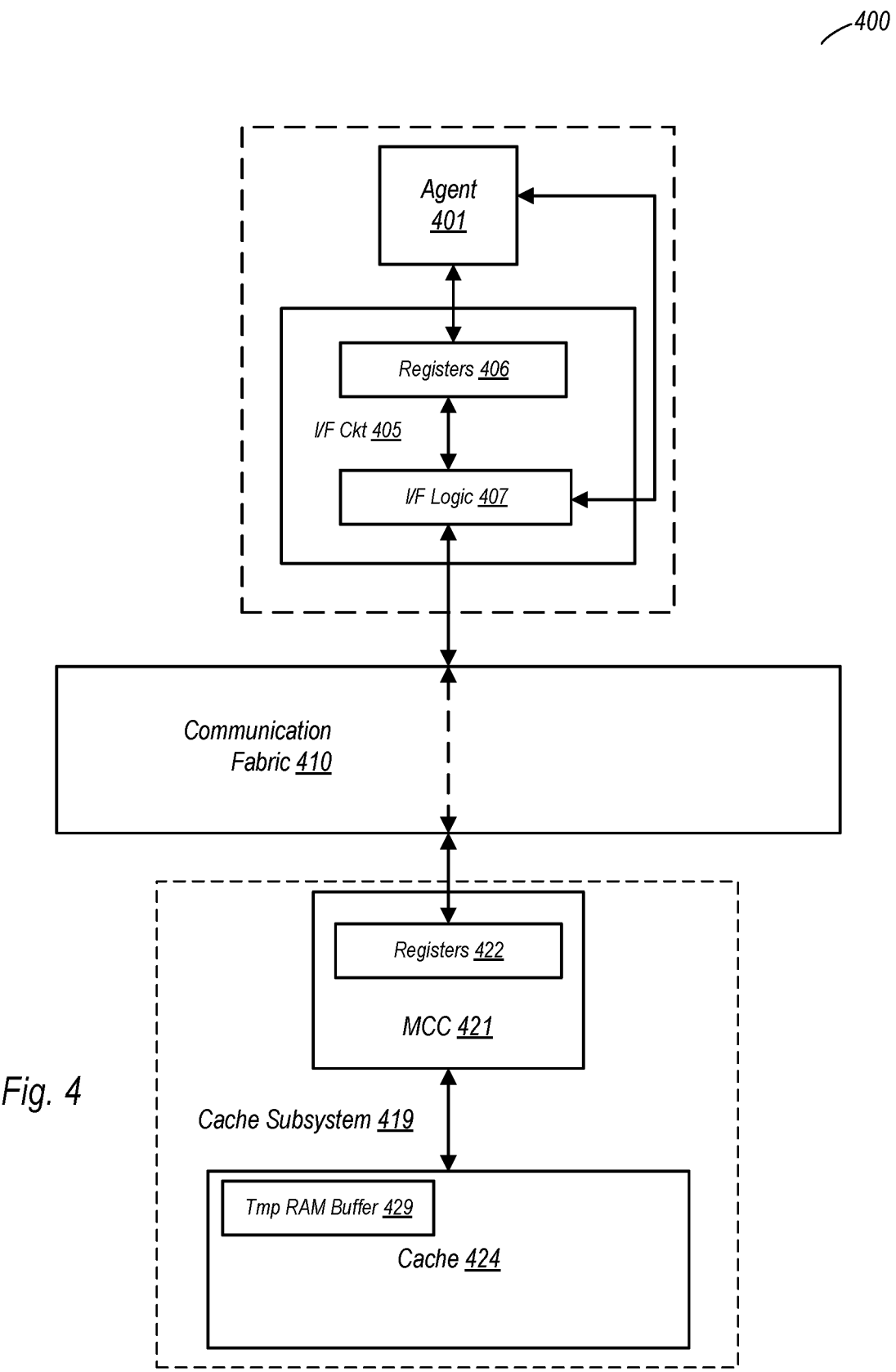
FIG. 4 is a block diagram illustrating additional details of an embodiment of an IC.

FIG. 4 is a block diagram illustrating additional details of an embodiment of an IC with respect to the configurable interface circuits. More particularly, FIG. 4 illustrates a portion of an IC 400 to highlight additional aspects of the various implementations of a configurable interface circuit.

In the embodiment shown, agent circuit 401 is coupled to configurable interface circuit 405, which includes registers 406 and interface logic circuit 407. Registers 406 in the embodiment shown may be implemented as a register file that stores various types of information, temporary and persistent, concerning the operations of IC 400. Information stored in registers 406 may include system configuration information, such as the numbers and types of other components on IC 400, topology of an on-chip communication network such as communication fabric 410, details regarding particular components (e.g., a range of physical memory addresses for a particular random access memory), and so on. Communications protocol information may also be stored in ones of registers 406 to facilitate communications with other components of IC 400. This configuration-specific information may be written into the appropriate ones of registers 406 during a system startup routine, and may be stored therein as long as the interface circuit 405 is operating. Embodiments are also possible and contemplated where some non-volatile storage is provided to store system information of the type discussed above.

Registers 406 may also include registers for providing temporary storage of information pertaining to communications between agent circuit 401 and other portions of IC 400. For example, when submitting a request or command to to memory, information indicating the particulars of the request/command may be written into certain ones of registers 406, and these particulars may include information that is not specific to the configuration of IC 400. This information may be temporarily stored therein until, e.g., such time that the request is conveyed through communication fabric 410 to the intended recipient(s). Upon receiving a response to a request, information may be written into various ones of registers 406, minus any information specific to the configuration of IC 400. The information may then be conveyed from the corresponding ones of registers 406, in either a push operation or a pull operation, to agent circuit 401.

Configurable interface circuit 405 also includes interface logic circuit 407, which is coupled to both registers 405 and agent circuit 401. The interface logic circuit 407 may carry out various functions, such as translating communications between the various non-configuration-specific and configuration-specific formats. In performing such translations, interface logic may access various ones of registers 406 that store information indicating the particular configuration of IC 400. This may enable interface logic 407 to indicate which components of IC 400 are to receive a particular communication initiated by agent circuit 401 and thus to avoid unnecessarily consuming bandwidth and resources of communication fabric 410 to broadcast information to components of IC 400 that are not intended to be a party of a particular exchange of information.

Interface logic 407 may also communicate directly with the respective agent circuit 401 to carry out various functions. For example, if a request to read a particular cache line from a cache controller was requested, interface logic 407 may provide an indication to agent circuit 401 that the cache line has been obtained and its contents are stored in appropriate ones of registers 406. Agent circuit 401 may then retrieve the cache line. Alternatively (and continuing the cache line example), embodiments are possible and contemplated wherein interface circuit 407 may push the requested cache line directly to agent circuit 401.

IC 400 in the embodiment shown includes a cache subsystem 419, which includes a memory cache controller 421 and a cache memory 424. The cache subsystem 419 may be part of a larger memory hierarchy/system implemented on IC 400. The cache memory 424 may be any suitable type of cache memory, and may implement various mapping schemes such as set-associative mapping or fully associative mapping. Memory cache controller 421 may perform various control functions related to the management of cache memory 424. These functions include reading information from cache 424, writing information to cache 424, evicting cache lines, marking cache lines as modified (dirty), invalidating cache lines, and so on.

Memory cache controller 421 in the embodiment shown includes registers 422, which, among other functions, provide temporary storage for use in communications with various ones of the interface circuits 405 that may be implemented on IC 400. For example, if agent circuit 401 submits a cache access request by writing information into registers 406, configurable interface circuit 405 may convey the request by causing information to be written into registers 422. Memory cache controller 421 may then carry out the request based on the information written into registers 422 in response to the conveying of the request from configurable interface circuit 405.

In some embodiments, memory cache controller 421 may enable a portion of cache memory 424 to be allocated as a temporary random access memory (RAM) buffer 429 for use by (and in response to a request by) a given one of the configurable interface circuits 405. This may be accomplished by memory cache controller 421 taking one or more cache lines out of their normal use and allocating them for use as the temporary RAM buffer 429 by binding them to a particular range of addresses (e.g., programmed I/O [PIO] addresses). The buffer may then be accessed for reads and writes by the corresponding configurable interface circuit 405 that initiated the request. Use of a portion of cache memory 424 as a temporary RAM buffer 429 may be particularly useful when an exchange involving a configurable interface circuit 405 includes moving a significant amount of data. After the cache space consumed by temporary RAM buffer 429 is no longer needed, memory cache controller 421 may deallocate the corresponding cache lines from their use as a buffer by removing the address bindings.

It is noted that at least some operations described above with reference to cache subsystem 419 may be similarly carried out in a memory system and with corresponding memory controllers. Thus, a memory controller as defined herein may also include registers having a role similar to those of registers 422 in the embodiment of FIG. 4. It is further noted that a memory system as described herein may encompass one or more cache subsystems while also recognizing the distinct roles of cache memory and system memory.

Figure 5:
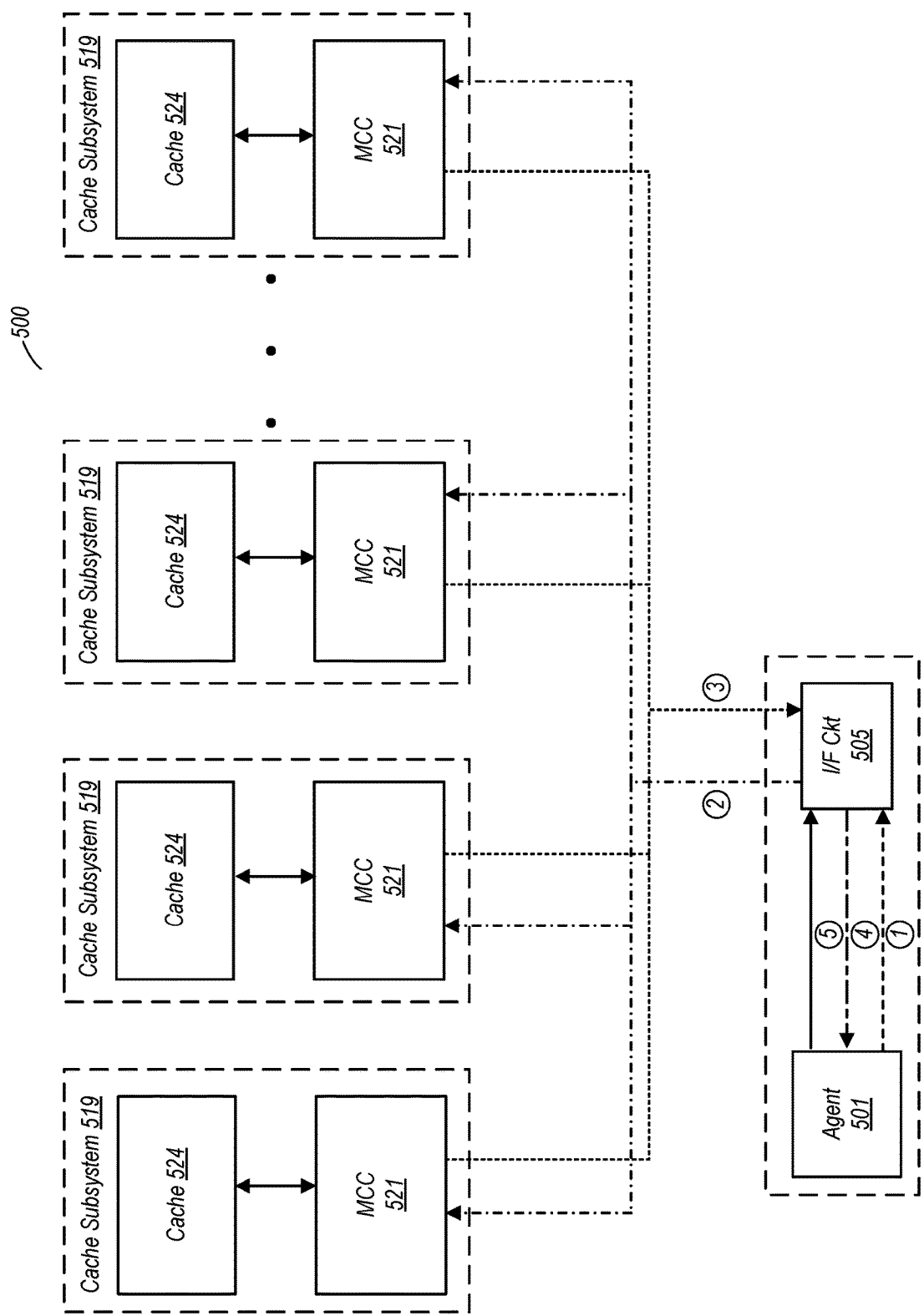
FIG. 5 is a block diagram illustrating a sequence of communications between an agent circuit and one or more cache subsystems, via an interface circuit, in one embodiment of an IC.

FIG. 5 is a block diagram illustrating a sequence of communications between an agent circuit and one or more cache subsystems, via an interface circuit, in one embodiment of an IC. In the illustrated embodiment, IC 500 includes a number of cache subsystems 519, each of which includes a memory cache controller 521 and a cache memory 524. Although not shown here, IC 500 may also include an on-chip network/communication fabric comprising one or more components to facilitate communications between the various components implemented thereon.

The sequence illustrated in FIG. 5 and discussed herein will be described in terms of a request by agent circuit 501. It is noted that this is but one type of communication/ exchange that may be facilitated by configurable interface circuit 505, as other types (including communications initiated by components other than agent circuit 501 but directed thereto) are possible and contemplated.

Agent circuit 501 in the embodiment shown may initiate a request (1) by submitting information regarding the request, in a first format, to configurable interface circuit 505. This may be accomplished by, e.g., writing information to registers in interface circuit 505, similar to the discussion above with respect to FIG. 4. Configurable interface circuit 505 may respond by translating the request into a second format and sending it to the various ones of the memory cache controllers 521 (2). The request may be sent in the second format due to the fact that agent circuit 501 may lack visibility to other components of IC 500 due to its non-configuration-specific design. Accordingly, the visibility to the other system components is provided by configurable interface circuit 505, which translates the request accordingly.

The request may be, to use one example, a request for a cache line by agent circuit 501 from a lower level cache that is embodied by the various instances of cache 524. Upon receiving the request, the various ones of memory cache controllers 521 may respond by either providing the requested cache line or an indication that the requested cache line was not found in its respectively coupled cache 524 (3). Upon receiving responses from each of the memory cache controllers 521, interface circuit 505 may provide an indication to agent circuit 501 that the request has been carried out (4). This may include, for example, providing the requested cache line, or indicating that the requested cache line has been received and is stored in registers of interface circuit 505 and ready for agent circuit 501. After receiving the requested cache line from interface circuit 505, agent circuit 501 may provide an acknowledgement signal to interface circuit 505 (5).

Figure 6:
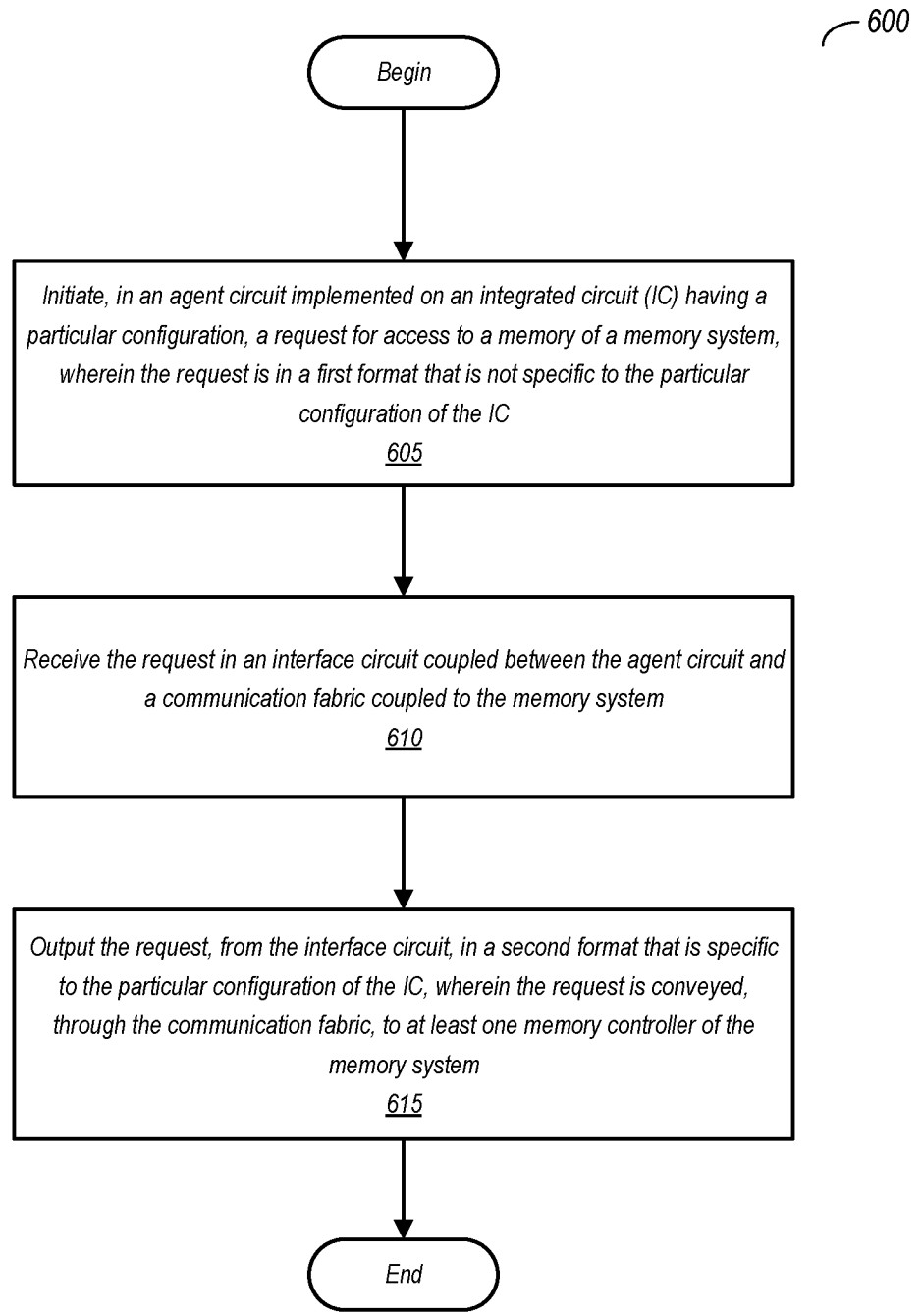
FIG. 6 is a flow diagram illustrating one embodiment of a method for operating an IC.

Methods for Operating an IC Having a Configurable Interface:

FIG. 6 is a flow diagram of one embodiment of a method for operating an IC having at least one instance of a configurable interface per the present disclosure. Method 600 may be performed with any of the hardware embodiments discussed above. Hardware embodiments capable of carrying out Method 600 but not otherwise disclosed herein are nevertheless considered to fall within the scope of this disclosure.

Method 600 includes initiating, in an agent circuit implemented on an integrated circuit (IC) having a particular configuration, a request for access to a memory of a memory system, wherein the request is in a first format that is not specific to the particular configuration of the IC (block 605). The method continues with receiving the request in an interface circuit coupled between the agent circuit and a communication fabric coupled to the memory system (block 610). Thereafter, the method includes outputting the request, from the interface circuit, in a second format that is specific to the particular configuration of the IC, wherein the request is conveyed, through the communication fabric, to at least one memory controller of the memory system (block 615).

In various embodiments, the method further includes providing, during a system startup, information regarding the particular configuration to the interface circuit, wherein providing the information includes specifying a number of memory controllers within the memory system and a topology of the communication fabric. Receiving information regarding the particular configuration of the interface circuit may be carried out by various mechanisms. For example, the configurable interface may send one or more queries to a communication fabric or other on-chip communication network and can determine the chip configuration based on the response received. In another embodiment, a system BIOS may broadcast configuration information to various circuit units of the IC/SoC, including the configurable interface circuits. Upon receiving configuration information, a given configurable interface circuit may store this information in, e.g., various registers therein, and may tailor its operations accordingly.

In various embodiments of the method, initiating the request comprises the agent circuit writing information in the first format to one or more registers in the interface circuit. Such embodiments may also include the interface circuit writing information into one or more memory controllers of the memory system in response to the agent circuit writing information into the one or more registers of the interface circuit. Embodiments may also include the interface circuit writing information into one or more cache controllers of the memory system in response to the agent circuit writing information into the one or more registers of the interface circuit.

In some embodiments, the method includes the interface circuit requesting an allocation of a portion of a cache memory of the memory system for use as a random access memory (RAM) buffer. More generally, the configurable interface circuit may communicate with various other circuit units on the IC/SoC including memory controllers and cache controllers within a memory subsystem. Communications may be conducted through a communications fabric, bussed communications system, or any other suitable mechanism that facilitates communications between various circuit units on the IC/SoC.

Figure 7:
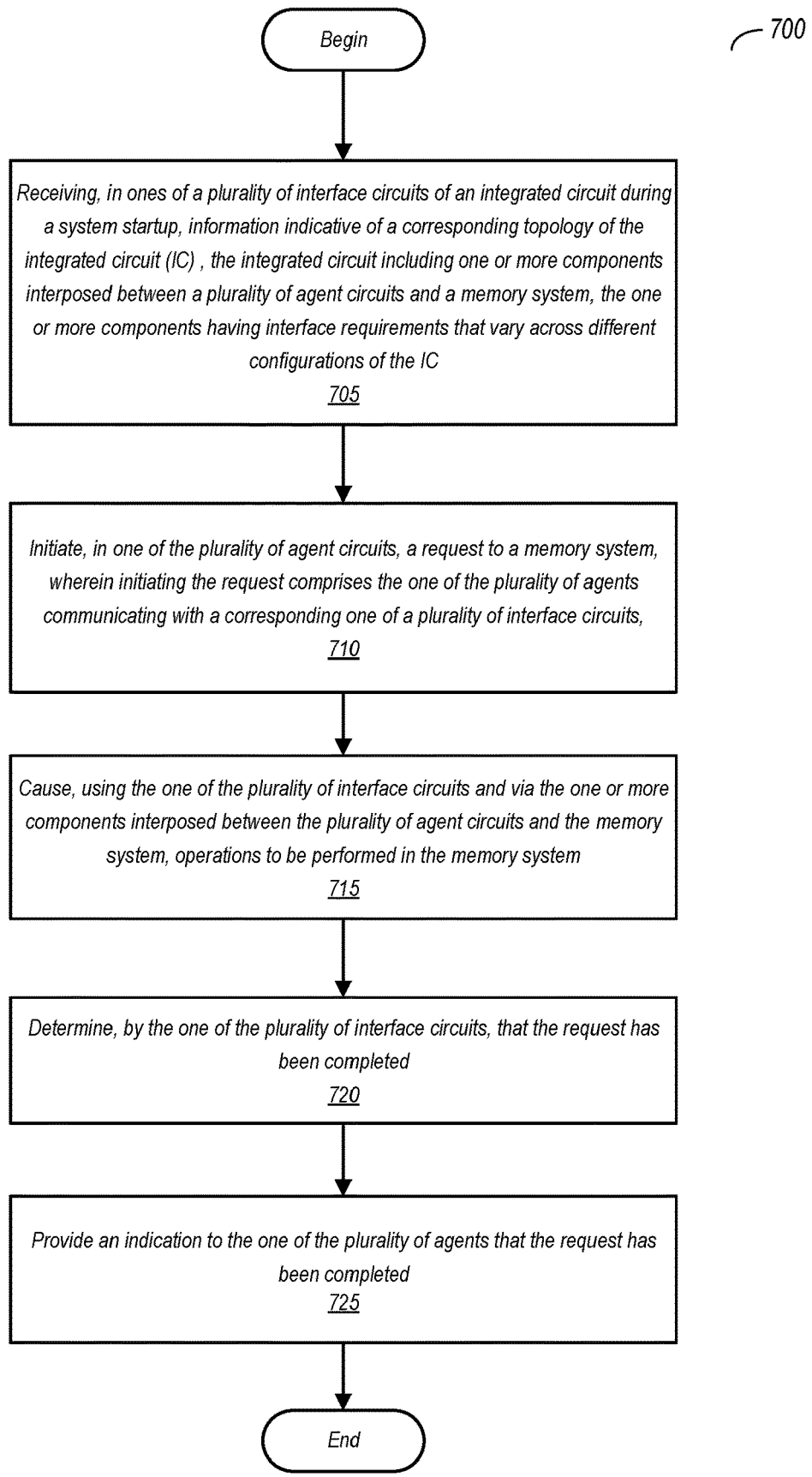
FIG. 7 is a flow diagram illustrating another embodiment of a method for operating an IC.

FIG. 7 is a flow diagram of another embodiment of a method for operating an IC/SoC having a configurable interface circuit. As with Method 600 discussed above, Method 700 may be performed using any of the various hardware embodiments discussed herein. Hardware embodiments not explicitly discussed herein but having the capability of carrying out Method 700 are considered to fall within the scope of this disclosure.

Method 700 includes receiving, in ones of a plurality of interface circuits of an integrated circuit (IC) during a system startup, information indicative of a corresponding topology of the IC, the integrated circuit including one or more components interposed between a plurality of agent circuits and a memory system, the one or more components having interface requirements that vary across different configurations of the IC (block 705). The method further includes initiating, in one of the plurality of agent circuits, a request to a memory system, wherein initiating the request comprises the one of the plurality of agents communicating with a corresponding one of a plurality of interface circuits (block 710). Thereafter, the method includes causing operations to be performed in the memory system using the one of the plurality of interface circuits and via the one or more components interposed between the plurality of agent circuits and the memory system (block 715). After the request is carried out, the method includes determining, by the one of the plurality of interface circuits, that the request has been completed (block 720). In response to the determining, the method includes providing an indication to the one of the plurality of agents that the request has been completed (block 725).

As noted above, Method 700 may be carried out by a number of different hardware embodiments. One such embodiment is an IC that includes a memory system and a plurality of agent circuits configured to make requests to the memory system. The system also includes one or more components interposed between the plurality of agent circuits and the memory system, wherein the one of more components have interface requirements that vary across different configurations of the IC. A plurality of interface circuits is coupled between corresponding ones of the plurality of agent circuits and the one or more components, wherein for a given agent circuit, a corresponding given interface circuit is configured to present an interface to the memory system via the one or more components that is transparent with respect to the interface requirements of the one or more components. Other hardware embodiments capable of carrying out method 700 are also possible and contemplated.

Figure 8:
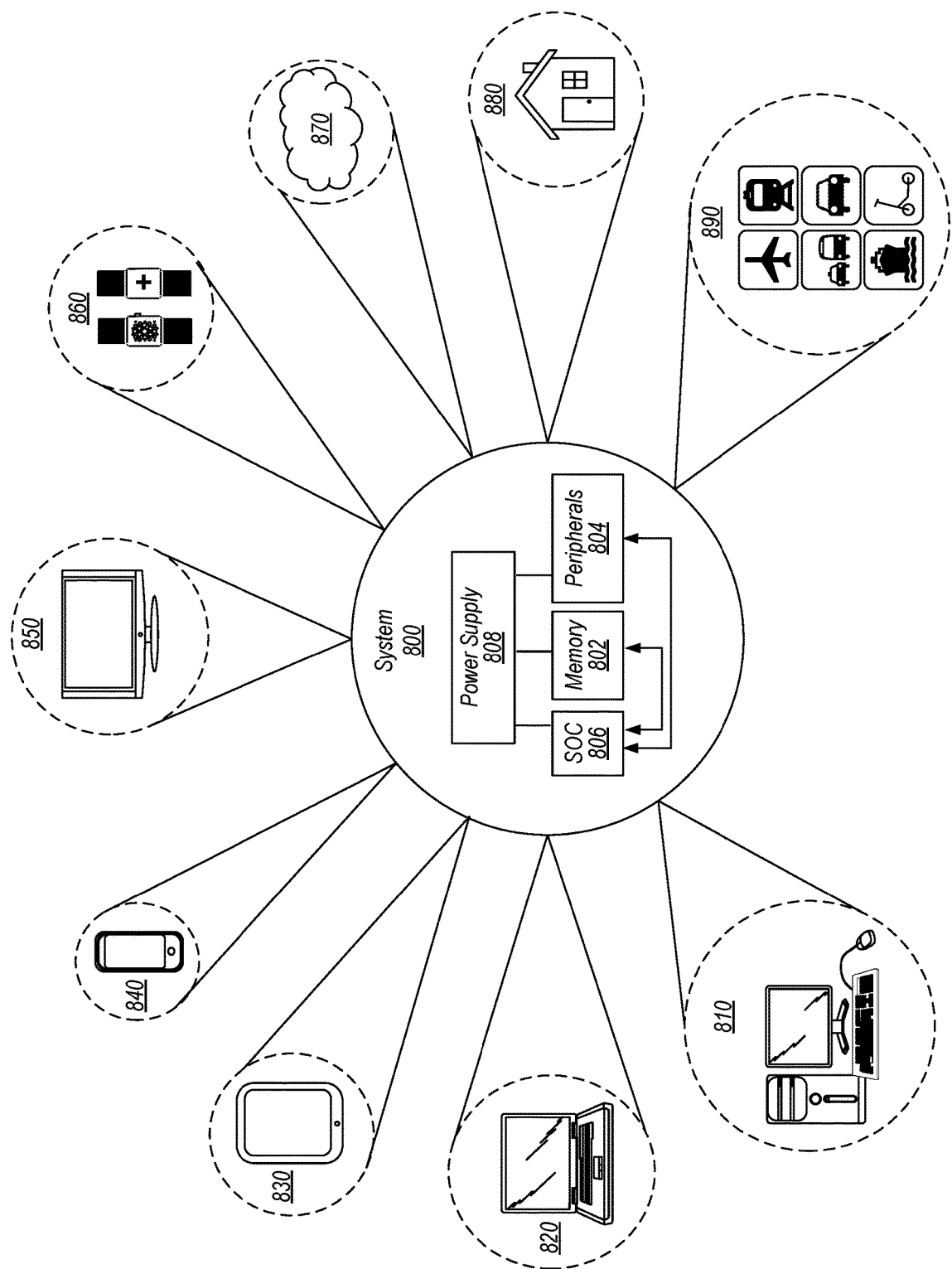
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 include multiple execution lanes and an instruction issue queue. In various embodiments, SoC 806 is coupled to external memory 802, peripherals 804, and power supply 808.

In various embodiments, SoC 806 may include instances of a configurable interface as discussed above. SoC 806 may be instantiated in various different configurations, with different types of communication networks/fabrics, different numbers of memory controllers, cache controllers, and so on. More generally, different versions of SoC 806 may have correspondingly different topologies. Nevertheless, a common design of a configurable interface as disclosed herein may be instantiated along with various agent circuits. This in turn may obviate the need to design different interface logic to facilitate communications between the various agent circuits and other components of SoC 806. The configurable interface circuits may be self-configuring in the manner described above, e.g., during a system startup routine.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, a smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
an integrated circuit (IC) having a particular configuration, wherein the IC includes:
a memory system;
a communication fabric coupled to the memory system;
a plurality of agent circuits configured to make requests to the memory system that are in a first format that is not specific to the particular configuration of the IC;
a plurality of interface circuits coupled between corresponding ones of the plurality of agent circuits and the communication fabric, wherein a given one of the plurality of interface circuits is configured to receive a request to the memory system in the first format and output the request in a second format that is specific to the particular configuration of the IC;
wherein the given one of the plurality of interface circuits includes a corresponding interface logic circuit and a corresponding register file, wherein the interface logic circuit is configured to initiate communications with components of the memory system in response to receiving a request from a correspondingly coupled agent, translate communications between the correspondingly coupled agent and the memory system between a non-configuration specific format and a configuration specific format, and to store information obtained from the request in one or more registers of the register file.

2. The apparatus of claim 1, wherein the given one of the plurality of interface circuits is configured to receive information indicative of the particular configuration of the IC during a startup of the apparatus, and further configured to store the information indicative of the particular configuration in one or more registers of the register file.

3. The apparatus of claim 1, wherein the particular configuration specifies a number of memory controllers within the memory system.

4. The apparatus of claim 1, wherein the particular configuration specifies a topology of the communication fabric.

5. The apparatus of claim 1, wherein the given one of the plurality of interface circuits is coupled to a particular one of the plurality of agent circuits, and wherein the particular one of the plurality of agent circuits is configured to initiate a memory command in the first format by writing to one or more registers of the register file in the given one of the plurality of interface circuits.

6. The apparatus of claim 5, wherein the corresponding interface logic circuit of the given one of the plurality of interface circuits is configured to, in response to the particular one of the plurality of agent circuits initiating the memory command, communicate the memory command in a second format to at least one memory controller of the memory system by writing to registers in the at least one memory controller.

7. The apparatus of claim 1, wherein the given one of the plurality of interface circuits is configured to control an amount of bandwidth for communication with the memory system for its respectively coupled one of the plurality of agent circuits.

8. The apparatus of claim 1, wherein the given one of the plurality of interface circuits is configured to request allocation of a portion of a cache memory of the memory system as a random access memory (RAM) buffer for a respective one of the plurality of agent circuits.

9. The apparatus of claim 1, wherein the memory system includes one or more cache controllers, and wherein the given one of the plurality of interface circuits is configured to output the request to one or more of the cache controllers.

10. A method comprising:
initiating, in an agent circuit implemented on an integrated circuit (IC) having a particular configuration, a request for access to a memory of a memory system, wherein the request is in a first format that is not specific to the particular configuration of the IC;
receiving the request in an interface circuit coupled between the agent circuit and a communication fabric coupled to the memory system;
initiating, by an interface logic circuit in the interface circuit and through the communication fabric, communication with components of the memory system specified in the request;
translating communications, using an interface logic circuit, between the agent circuit and the memory system between a non-configuration specific format and a configuration specific format;
storing, in one or more registers of a register file in the interface circuit, information obtained from the request; and
outputting the information obtained from the request, from the interface circuit, in a second format that is specific to the particular configuration of the IC, wherein the request is conveyed, through the communication fabric, to at least one memory controller of the memory system.

11. The method of claim 10, further comprising providing, during a system startup, information regarding the particular configuration to the interface circuit, wherein providing the information includes specifying a number of memory controllers within the memory system and a topology of the communication fabric, and wherein the method further comprises storing the information regarding the particular configuration, in selected registers of the register file.

12. The method of claim 10, wherein initiating the request comprises the agent circuit writing information in the first format to at least one register in the register file of the interface circuit.

13. The method of claim 12, further comprising the interface logic circuit writing information into one or more memory controllers of the memory system in response to the agent circuit writing information into the at least one register of the register file.

14. The method of claim 12, further comprising the interface logic circuit writing information into one or more cache controllers of the memory system in response to the agent circuit writing information into the at least one register of the register file.

15. The method of claim 10, further comprising the interface circuit requesting an allocation of a portion of a cache memory of the memory system for use as a random access memory (RAM) buffer.

16. An apparatus, comprising:
an integrated circuit (IC), wherein the IC includes:
a memory system;
a plurality of agent circuits configured to make requests to the memory system;
one or more components interposed between the plurality of agent circuits and the memory system, wherein the one of more components have interface requirements that vary across different configurations of the IC; and
a plurality of interface circuits coupled between corresponding ones of the plurality of agent circuits and the one or more components, wherein for a given agent circuit, a corresponding given interface circuit of the plurality of interface circuits is configured to present an interface to the memory system via the one or more components that is transparent with respect to the interface requirements of the one or more components;
wherein the given interface circuit includes a corresponding interface logic circuit configured to communicate with the one or more components and a correspondingly coupled one of the plurality of agent circuits and to translate communications between the correspondingly coupled one of the plurality of agent circuits and the memory system between a non-configuration specific format and a configuration specific format; and
wherein the given interface circuit further includes a register file, wherein the interface logic circuit is configured to access, from one or more registers of the register file, protocol information to facilitate communications with the one or more components.

17. The apparatus of claim 16, wherein the one or more components and the memory system are arranged in a selected topology, wherein the given interface circuit is configured to route requests from the given agent circuit to the memory system according to the interface requirements of the selected topology in a manner that is transparent to the given agent circuit.

18. The apparatus of claim 17, wherein the given interface circuit is configured to receive and store, in at least one register of the register file, information indicative of the selected topology during a system startup, wherein the information indicative of the selected topology includes a number of memory controllers in the memory system.

19. The apparatus of claim 17, wherein the one or more components comprise a communication fabric, and wherein the given interface circuit configured to receive and store, in at least one register of the register file, during a system startup, information indicative of a selected topology of the communication fabric.

20. The apparatus of claim 16, wherein ones of the plurality of agent circuits are configured to make requests to the memory system by writing the requests to at least one register in the register file and in a first format that is not specific to a particular configuration of the IC, and wherein the interface logic circuit of the given interface circuit is configured to convey the requests, to the memory system via the one or more components in a second format that is specific to the particular configuration of the IC.

* * * * *